(12) United States Patent
Adams et al.

(10) Patent No.: US 8,799,394 B1
(45) Date of Patent: *Aug. 5, 2014

(54) SYSTEMS AND METHODS PROVIDING A MOBILE ZERO CLIENT

(71) Applicant: NCS Technologies, Inc., Gainesville, VA (US)

(72) Inventors: Michael Dewayne Adams, Fairfax, VA (US); An Van Nguyen, Fairfax, VA (US); Lakshmi Santosh, Columbia, MD (US); Dinh Van Nguyen, San Jose, CA (US); Brian James Gentry, Bristow, VA (US); Binh Kien Thai, Centerville, VA (US); Paul Richard Gardner, Sterling, VA (US); Jonathan Douglas Petty, Owens Mills, MD (US)

(73) Assignee: NCS Technologies, Inc., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,934

(22) Filed: Feb. 4, 2014

Related U.S. Application Data

(63) Continuation of application No. 14/019,216, filed on Sep. 5, 2013, now Pat. No. 8,682,999.

(51) Int. Cl.
| | |
|---|---|
| *G06F 15/16* | (2006.01) |
| *G06F 15/177* | (2006.01) |
| *G06F 15/173* | (2006.01) |
| *G06F 3/00* | (2006.01) |
| *H04M 3/00* | (2006.01) |
| *H04L 29/08* | (2006.01) |

(52) U.S. Cl.
CPC .................................. *H04L 67/04* (2013.01)
USPC ............ 709/208; 709/220; 709/223; 710/11; 455/418

(58) Field of Classification Search
None
See application file for complete search history.

(56) References Cited

U.S. PATENT DOCUMENTS

| | | | |
|---|---|---|---|
| 7,685,253 B1 | 3/2010 | Valia | 709/217 |
| 2007/0083660 A1 | 4/2007 | Thornton | 709/227 |
| 2011/0320405 A1 | 12/2011 | Hsu et al. | 707/634 |
| 2012/0092277 A1 | 4/2012 | Momchilov | 345/173 |

*Primary Examiner* — Ranodhi Serrao
(74) *Attorney, Agent, or Firm* — Pillsbury Winthrop Shaw Pittman LLP

(57) ABSTRACT

The disclosure relates to a portable computing device configured to selectably switch between a wired zero client mode in which the portable computing device operates as a terminal for a host computer via a wired communication channel, a wireless zero client mode in which the portable computing device operates as a terminal for the host computer via a wireless communication channel, and a local mode in which the portable computing device operates independently from the host computer. The portable computing device may include one or more zero client processors that facilitate operation in the wired or wireless zero client mode and one or more local control processors that facilitate operation in the local mode. The portable computing device may include input devices used to receive inputs for the host computer during the wireless or wired zero client modes or for the local control processors during the local mode.

24 Claims, 9 Drawing Sheets

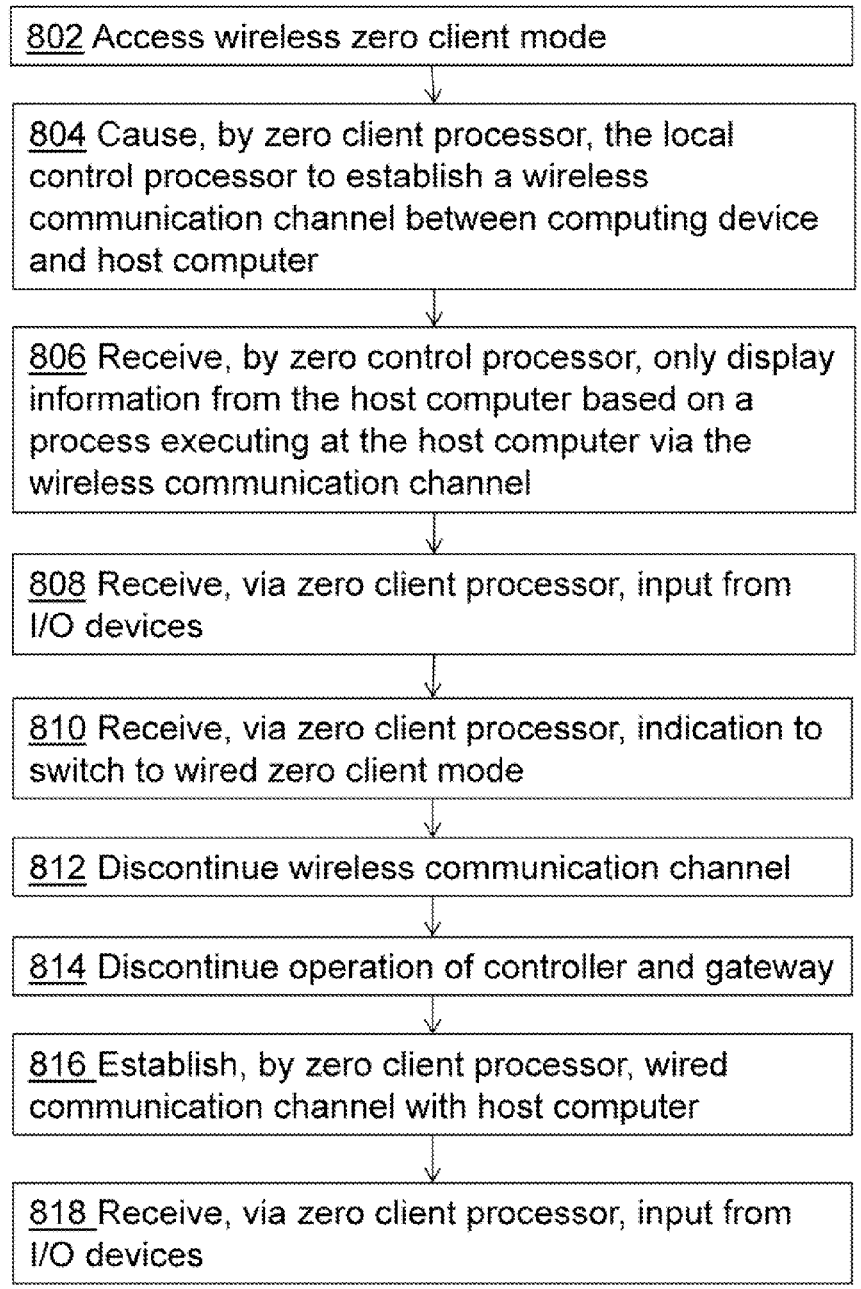

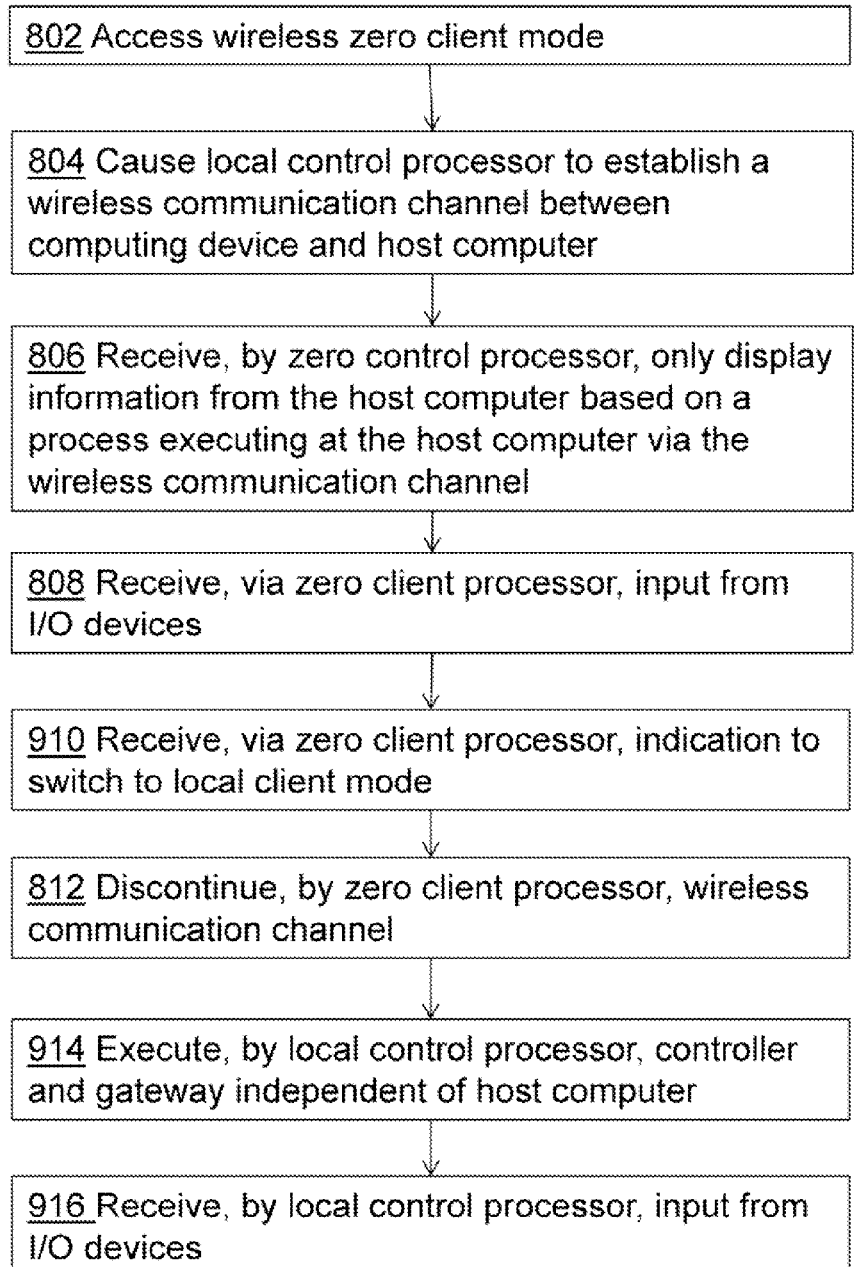

SYSTEMS AND METHODS PROVIDING A MOBILE ZERO CLIENT

CROSS-REFERENCE TO RELATED APPLICATIONS

This application is a continuation application of co-pending U.S. patent application Ser. No. 14/019,216, entitled "Systems and Methods Providing a Mobile Zero Client," filed on Sep. 5, 2013, which is incorporated by reference herein in its entirety.

FIELD OF THE INVENTION

The invention relates to a portable computing device configured to selectably switch between a wired zero client mode in which the portable computing device operates as a terminal for a host computer via a wired communication channel, a wireless zero client mode in which the portable computing device operates as a terminal for the host computer via a wireless communication channel, and a local mode in which the portable computing device operates independently from the host computer.

BACKGROUND OF THE INVENTION

Data and systems security has been a priority for systems administrators especially as computing devices have become portable and the workforce has accordingly become more mobile. However, allowing portable devices to access, store, and manage data and applications locally can be problematic because enterprise security may be put at risk as the portable devices become lost, connect to insecure networks (such as public "hotspots"), and/or otherwise become vulnerable to attack. Conventional systems attempt to address some security issues with the use of remote processing where terminals connect to host computers that serve display content.

Conventional systems for remote processing, however, typically require dedicated wired connections for the terminals to operate in a truly zero client manner. With the portability of devices, this may limit the usability of such systems. Conventional systems for remote processing suffer from these and other problems.

SUMMARY OF THE INVENTION

The disclosure solving these and other drawbacks of conventional systems relates to a portable computing device configured to selectably switch between a wired zero client mode in which the portable computing device operates as a terminal for a host computer via a wired communication channel, a wireless zero client mode in which the portable computing device operates as a terminal for the host computer via a wireless communication channel, and a local mode in which the portable computing device operates independently from the host computer. The portable computing device may include one or more zero client processors that facilitate operation in the wired or wireless zero client mode and one or more local control processors that facilitate operation in the local mode. The portable computing device may include input devices such as a keyboard that is used to receive inputs for the host computer during the wireless or wired zero client modes or for the local control processors during the local mode. The host computer may be remote from the portable computing device.

When operating in the wired or wireless zero client mode, the portable computing device uses the one or more zero client processors for basic functions and relies on a host computer remote from the portable computing device to provide display information based on a process executing at the host computer. For example, when operating in the wired or wireless zero client mode, the portable computing device acts as a terminal (e.g., display and input interface) for the host computer. In this manner, information, application, and/or other logic remains securely at the host computer instead of at the portable computing device when operating in the wired or wireless zero client mode.

During the wired zero client mode, the portable computing device communicates with the host computer via a wired network connection. When operating in the wired zero client mode, the one or more zero client processors establish the wired network connection to the host computer independent of the one or more local control processors.

During the wireless zero client mode, the portable computing device communicates with the host computer via a wireless network connection. When operating in the wireless zero client mode, the one or more zero client processors rely on the one or more local control processors to facilitate the wireless network connection to the host computer.

When operating in the local mode, the portable computing device uses one or more local control processors to function independent of the host computer as well as independent of the one or more zero client processors. In the local mode, the portable computing device may operate as a standalone computing device.

The portable computing device may include one or more local control processors and one or more zero client processors configured to perform some or all of a functionality of a plurality of modules. For example, the one or more local control processors may be configured to execute a controller and gateway (CG) module and the one or more zero client processors may be configured to execute a zero client module. Other modules may be executed by the one or more local control processors and/or the one or more zero client processors.

The CG module may be configured to operate the portable computing device in a local client mode, facilitate mode management (e.g., selection) for the portable computing device, provide functionality to the portable computing device during the wireless or wired zero client mode, and/or to provide other functionality to the portable computing device. In some implementations, the CG module may include a local client module, a mode management module, a network management module, a power management module, and/or other modules. In some implementations, the local control processor may cause the CG module to be executed on the portable computing device.

In some implementations, the local client module may be configured to operate the portable computing device in a local client mode. The local client module may be configured to operate the portable computing device independent of the host computer. For example, the local client module may include or otherwise execute an operating system of the portable computing device. In some implementations, the local client module may be configured to receive input from one or more input devices during the local client mode. The local control processors may also be configured to provide display information based on one or more processes executing at the local control processors.

In some implementations, the mode management module may be configured to switch between a plurality of modes of operation of the portable computing device. For example, the mode management module may facilitate switching from one of the plurality of modes to another of the plurality of modes.

The plurality of modes may include, for example, a local client mode, a wireless zero client mode, a wired zero client mode, and/or other modes of operation.

In some implementations, the network management module may be configured to provide network functionality during the wireless zero client mode. For example, during a wireless zero client mode, the network management module may establish a wireless communication channel such as a Virtual Private Network (VPN) with the host computer on behalf of the one or more zero client processors because the zero client processors may be unable to perform this function.

In some implementations, the power management module may provide power management functionality to the portable computing device during the wireless zero client mode, the wired zero client mode, and/or the local client mode. For example, the power management module may manage the provision of power to the portable computing device during the wireless zero client mode, the wired zero client mode, and/or the local client mode. The power management module may also manage one or more power schemes for the portable computing device, during the wireless zero client mode, the wired zero client mode, and/or the local client mode.

The zero client module may be configured to operate the portable computing device in a wireless or wired zero client mode. In some implementations, when in the wireless or wired zero client mode, the one or more zero client processors may rely on the host computer to provide display information based on a process executing at the host computer. When in the wireless or wired zero client mode, the one or more zero client processors are configured to cause the portable computing device to act as a terminal for the host computer.

In some implementations, the zero client processors receive display information based on a process executing at the host computer. When in the wireless or wired zero client mode, because the one or more zero client processors are separate from any operating system executing on the one or more local control processors, the operating system of the one or more local control processors may not be vulnerable. Correspondingly, data and processes may similarly not be vulnerable to risk because only display information is communicated from the host computer to the portable computing device during the wireless or wired zero client mode.

In some implementations, the zero client module may comprise an I/O module, a mode management module, a network management module, and/or other modules that provide functionality during the zero client mode.

In some implementations, the I/O module may be configured to receive input information via an I/O device to be communicated to the host computer. The input information received via the I/O device may be based on a process executing at the host computer. The I/O module may also be configured to receive display information to display via the I/O device. The display information received from the host computer may be based on a process executing at the host computer and may be responsive to the input information received via the I/O device and communicated to the host computer. In some implementations, the I/O module may execute a zero client communication protocol with the host computer. The zero client communication protocol may facilitate the host computer communicating to the zero client processor the display information based on the process executing at the host. In some implementations, only display information may be communicated between the host computer and the zero client processor during zero client mode.

In some implementations, the mode management module may be configured to allow the portable computing device to manage a plurality of modes of zero client operation of the portable computing device. For example, the mode management module may facilitate, for the portable computing device, switching from wired zero client mode to wireless zero client mode, from wireless zero client mode to wired zero client mode, and/or between other modes of zero client operation.

In some implementations, the wired network management module may provide wired network functionality to the portable computing device during the wired zero client mode.

The storage module may be configured to store information related to system usage. For example, the storage information may be configured to store information related to the plurality of modes and system usage related to a respective mode. For example, the storage module may be configured to store an amount of time the portable computing device spends in a respective mode. The storage module may also be configured to store processing time and processing utilization for the one or more local control processors and the one or more zero client processors.

According to some implementations, a portable computing device may be configured to switch between a plurality of modes that include a wired zero client mode and a wireless zero client mode. The portable computing device may comprise one or more local control processors and one or more zero client processors. The local control processors may be configured to execute a controller and gateway on the portable computer device to operate the portable computer device in a local mode that operates independent of a host computer remote from the portable computer device, wherein the one or more local control processors receive input from an input device during the local mode, receive an indication to switch from the local mode to a zero client mode that relies upon the host computer for operation, discontinue the local mode based on the received indication to switch to the zero client mode, and/or provide other functionality. The one or more zero client processors may be configured to receive, from the one or more local control processors, at least partial control of the portable computing device when the local mode has been discontinued and based on the indication to switch to the zero client mode, wherein the one or more zero client processors receive input from the input device during the zero client mode, and execute a zero client communication protocol with the host computer, wherein the zero client communication protocol facilitates the host computer communicating to the one or more zero client processors only display information based on a process executing at the host computer.

According to some implementations, a portable computing device may be configured to switch between a plurality of modes that include a wired zero client mode and a wireless zero client mode. The device may comprise one or more local control processors and one or more zero client processors. The zero client processors may be configured to establish a wired communication channel with a host computer remote from the portable computing device during a wired zero client mode, wherein the portable computing device relies on the host computer for operation during the wired zero client mode, execute, independent of the one or more local control processors, a wired zero client communication protocol with the host computer, wherein the wired zero client communication protocol facilitates the host computer communicating to the one or more zero client processors only display information based on a process executing at the host computer, wherein the one or more zero client processors receive input from one or more input devices during the wired zero client mode, receive an indication to switch from the wired zero client mode to a wireless zero client mode, wherein the portable computing device continues to rely on the host computer for operation during the wireless zero client mode, discontinue the wired communication channel with the host computer based on the received indication to switch to the wireless zero client mode, and cause the one or more local control processors of the portable computing device to establish a wireless communication channel between the one or more zero client processors and the host computer based on the indication to switch from the wired zero client mode to the wireless zero client mode, wherein the one or more zero client processors receives only display information from the host computer based on a process executing at the host computer via the wireless communication channel established by the one or more local control processors during the wireless zero client mode.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 8 illustrates a process for operating a portable computing device configured to switch between one or more zero client modes and a local mode, according to an aspect of the invention.

FIG. 9 illustrates a process for operating a portable computing device configured to switch between one or more zero client modes and a local mode, according to an aspect of the invention.

DETAILED DESCRIPTION OF THE INVENTION

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

Figure 1:
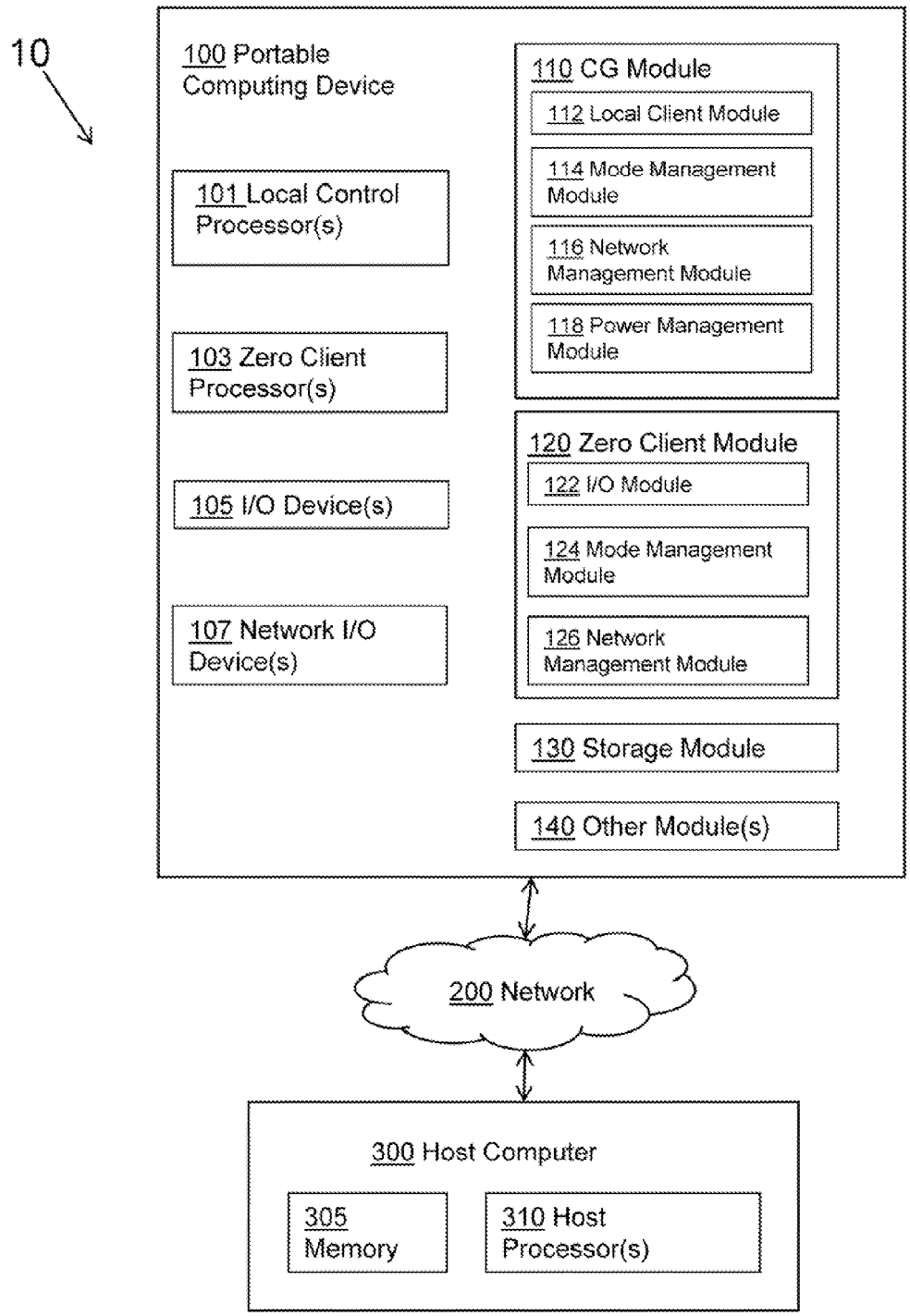
FIG. 1 illustrates a system for operating a portable computing device configured to switch between one or more zero client modes and a local mode, according to an aspect of the invention.

FIG. 1 illustrates a system 10 for operating a portable computing device 100 configured to switch between one or more zero client modes and a local mode, according to an aspect of the invention. System 10 may comprise a portable computing device 100, a host computer 300 remote from the portable computing device 100, and/or other components. During a zero client mode, the portable computing device 100 may communicate with the host computer 300 via a network 200. The network communication may comprise wired and/or wireless communication. When operating in a zero client mode, the portable computing device 100 operates as a terminal for the host computer 300 remote from the portable computing device 100. For example, in a zero client mode, the portable computing device 100 receives only display information from the host computer 300 based on a process executing at the host computer 300 and may communicate inputs received via I/O devices 105 to the host computer. Thus, any operating system of the portable computing device 100 may not be vulnerable during the zero client mode. Further, the data being processed remotely may not be vulnerable to risk because the data remains securely at the host computer 300.

In some implementations, the portable computing device 100 may include one or more local control processors 101 and one or more zero client processors 103 configured to perform some or all of a functionality of a plurality of modules. A local control processor 101 and a zero client processor 103 may be collocated on a single circuit board, collocated on multiple circuit boards, or may be located separately on their own respective circuit board(s). In some implementations, a local control processor 101 and a zero client processor 103 may share one or more ports corresponding to some of the one or more respective I/O devices 105. In some implementations, a local control processor 101 and a zero client processor 103 may respectively communicate with one or more separate ports corresponding to some of the one or more I/O devices 105.

In some implementations, the portable computing device 100 may also include one or more input/output (I/O) devices 105. One or more of the I/O devices 105 may be internal to the portable computing device 100. One or more of the I/O devices 105 may be external to the portable computing device 100. For example, the I/O devices 105 may include, for example, one or more LCD displays, other types of displays, a keyboard, a touch pad, a mouse, a printer, one or more devices required for authentication purposes (e.g., CAC reader, fingerprint scanner, and/or other biometric authenticating devices), one or more USB devices, and/or other devices used for input/output functions related to the portable computing device 100.

In some implementations, the portable computing device 100 may also include one or more network I/O devices 107 which allow the portable computing device to connect to a network (e.g., network 200). One or more of the network I/O devices 107 may facilitate one or more wired network connections. One or more of the network I/O devices 107 may facilitate one or more wireless network connections. For example, the network I/O devices 107 may facilitate a network connection to the host computer 300 via, for example, wired Ethernet including legacy and fiber optic networks, Wi-Fi, 4G LTE, and/or other network communication protocols. In some implementations, the network devices 107 may facilitate auto-negotiation for the portable computing device 100 to interface with the appropriate network communication protocol. The appropriate network communication protocol may depend upon, for example, the mode in which the portable computing device 100 is operating (e.g., a local client mode, a wired zero client mode, a wireless zero client mode, and/or another type of operation mode), the availability of a network communication protocol for the portable computing device 100, and/or other network communication factors.

In some implementations, the one or more local control processors 101 and one or more zero client processors 103 may be configured to perform some or all of a functionality of a plurality of modules. The plurality of modules may include, for example, a CG module 110, a zero client module 120, a storage module 130, and/or other modules that perform some functionality. In some implementations, the one or more local control processors 101 may be configured to execute the CG module 110 and the one or more zero client processors 103 may be configured to execute the zero client module 120.

The CG module 110 may be configured to operate the portable computing device 100 in a local client mode, facilitate mode management for the portable computing device 100, provide functionality to the portable computing device 100 during zero client mode, and/or provide other functionality to the portable computing device 100. In some implementations, the CG module 110 may include a local client module 112, a mode management module 114, a network management module 116, a power management module 118, and/or other modules that provide functionality to the portable computing device 100. In some implementations, the local control processor 101 may cause the CG module 110 to be executed on the portable computing device 100.

In some implementations, the local client module 112 may be configured to operate the portable computing device 100 in a local client mode. The local client module 112 may be configured to operate the portable computing device 100 independent of the host computer 300. In some implementations, the local client module 112 may be configured to receive input from one or more I/O devices 105 during the local client mode. The local control processor 101 may also be able to process the input received from the one or more I/O devices 105 and/or data received via network 200. The local control processor 101 may also be configured to provide display information based on one or more processes executing at the local control processor 101.

In some implementations, the mode management module 114 may be configured to manage a plurality of modes of operation of the portable computing device 100. For example, the mode management module 114 may facilitate, for the portable computing device 100, switching from one of the plurality of modes to another of the plurality of modes. The plurality of modes may include, for example, a local client mode, a zero client mode, and/or other modes of operation. The zero client mode may include, for example, a wired zero client mode, a wireless zero client mode, and/or other modes of operation in which the portable computing device 100 operates as a terminal for host computer 300.

For example, the portable computing device 100 may receive an indication to switch from one mode of operation to another mode of operation. In some implementations, the indication may include, for example, a selection of an option displayed via an operating menu, a toggling of a mechanical or soft switch of the portable computing device 100, removal of the portable computing device 100 from a docking station 400 via which a wired connection to network 200 was maintained, the docking of the portable computing device 100 at a docking station 400 via which a wired connection to network 200 may be maintained, a command received via a keyboard connected as an I/O device 105 to (e.g., integrated with or separate from) the portable computing device, and/or by other indications to switch operating modes of the portable computing device 100.

The mode management module 114 may facilitate switching from local client mode to a wired zero client mode, from local client mode to a wireless zero client mode, from wired zero client mode to local client mode, from wired zero client mode to wireless zero client mode, from wireless zero client mode to local client mode, from wireless zero client mode to wired zero client mode, and/or other switches of operation modes for the portable computing device 100. The local control processor 101 may facilitate switching operation mode responsive to receiving the indication to switch operation mode. For example, when switching from a local client mode to a zero client mode, the local control processor 101 may discontinue operation of an operating system executed by the local control processor 101. The local control processor 101 may also facilitate providing control of one or more components of the portable computing device 100 to the zero client processor 103. For example, the local control processor 101 may facilitate providing control of a display of the portable computing machine 100 to the zero client processor 103. In some implementations, the local control processor 101 may retain control of one or more components of the portable computing device 100 in zero client mode. For example, the local control processor 101 may facilitate providing control of one or more I/O devices 105 (e.g., a display of the portable computing device 100, and/or other I/O device 105) to the zero client processor 103 and may retain control of other I/O devices 105 (e.g., a speaker, and/or other I/O device 105). The local control processor 101 may be configured to facilitate providing control over one or more components of the portable computing device 100 (e.g., I/O devices 105, network I/O devices 107, and/or other components) to the zero client processor 103 in local client mode, wired zero client mode, wireless zero client mode, and/or other mode of operation of the portable computing device 100.

In some implementations, the local client processor 101 may be configured to provide functionality in some or all operation modes of the portable computing device 100. For example, in a zero client mode, the local control processor 101 and the zero client processor 103 may both be configured to provide functionality. In another example, only the zero client processor 103 may be configured to provide functionality in a zero client mode. In a local client mode, the local control processor 101 and the zero client processor 103 may be configured operate to provide functionality. In another example, only the local control processor 101 may be configured to provide functionality in a local client mode.

In some implementations, the mode management module 114 may also be configured to facilitate the provision of an operating menu for display. The operating menu may be displayed during local client mode and during zero client mode. The operating menu may display one or more options to a user of the portable computing device 100, including, for example, facilitating a user login to the portable computing device 100, selecting a mode of operation, switching from one mode of operation to another, selecting a connection mode (e.g., wired connection, wireless connection, VPN connection, and/or other types of connection), selecting a power scheme, selecting potential display configurations, changing a characteristic of an output of the portable computing device 100 or an I/O device 105 of the portable computing device 100 (e.g., an audio volume of output, a brightness of a screen, and/or other characteristics of output to an I/O device 105 or to the portable computing device 100) and/or other options via which a user may access the portable computing device 100. In some implementations, the options displayed via the operating menu may differ between local client mode and zero client mode. In some implementations, the operating menu may display at least an option to select a mode of operation and an option to switch from one mode of operation to another during both local client mode and zero client mode.

In some implementations, the network management module 116 may provide network functionality to the portable computing device 100 during a zero client mode. For example, the network management module 116 may be configured to provide virtual private network (VPN) tunneling during some implementations of the wireless zero client mode. When the network management module 116 provides a VPN tunnel to the host computer 300, the network management module 116 routes traffic over the network on behalf of the one or more zero client processors, allowing the one or more zero client processors to operate in a wireless mode that would otherwise not be possible without the network management module 116. With the provision of a VPN tunnel, the network management module 116 may also translate network, protocols as needed for the portable computing device 100 and the host computer 300. In some implementations, the network management module 116 may also be configured to provide VPN tunneling during some implementations of the wired zero client mode.

During the wireless zero client mode, the network management module 116 receive data to be communicated from the portable computing device 100 to the host computer 300 via the zero client module 120 (e.g., via the I/O module 122 of the zero client module 120). The CG module 110 may provide a wireless network connection between the portable computing device 100 and the host computer 300. The wireless network connection may be established via Wi-Fi, 4G LTE, and/or any other suitable network protocol.

In some implementations, the power management module 118 may provide power management functionality to the portable computing device 100 during the wireless zero client mode, the wired zero client mode, and/or the local client mode. For example, the power management module 118 may manage the provision of power to the portable computing device 100 during the wireless zero client mode, the wired zero client mode, and/or the local client mode. The power management module 118 may also manage one or more power schemes for the portable computing device 100, during the wireless zero client mode, the wired zero client mode, and/or the local client mode. For example, the power management module 118 may facilitate moving from one power scheme to another power scheme. The power management module 118 may also make a set of power schemes for a respective mode of operation. For example, the power management module 118 may make available a first full power scheme and a first power saving scheme for the local client mode, a second full power scheme and a second power saving scheme for a wired zero client mode, a third full power scheme and a third power saving scheme for a wireless zero client mode, and/or other full power schemes and power saving schemes for the portable computing device 100. In some implementations, one or more of the first full power scheme, second full power scheme, third full power scheme, first power saving scheme, second power saving scheme, third power saving scheme, and/or other power saving schemes may be the same or similar. In some implementations, the power management module 118 may be a module of the portable computing device 100 that is separate from the CG module 110.

The zero client module 120 may be configured to operate the portable computing device 100 in a zero client mode. In some implementations, when in zero client mode, the portable computing device 100 may receive from the host computer 300 only display information based on processes occurring at the host computer. When in zero client mode, the portable computing device 100 is configured to execute based on the one or more zero client processors 103.

In some implementations, the zero client module 120 may comprise an I/O module 122, a mode management module 124, a network management module 126, and/or other modules that provide functionality during the zero client mode.

In some implementations, the I/O module 122 of the zero client module 120 may be configured to receive input information via an I/O device 105 to be communicated to the host computer 300. The input information may include, for example, a keyboard selection, an audio input, a mouse movement, a click of a mouse, a contact with a touchscreen, one or more inputs, and/or other interactions with the portable computing device 100 and/or one or more I/O devices 105 of the portable computing device 100. The input information received via the I/O device 105 may provide input in relation to a process executing at the host computer 300. The I/O module 122 may also be configured to receive display information from the host computer 300 to display via the I/O device 105. The display information received from the host computer 300 may be based on a process executing at the host computer 300 and may be responsive to the input information received via the I/O device 105 and communicated to the host computer 300. For example, the host computer 300 may receive the input information, recognize the input information, affect a process executing at the host computer 300 based on the input information, and/or send display information based on the input information.

In some implementations, the display information received from the host computer 300 may include, for example, one or more of a bitmap object, a vector image, a pixel array, a video, a gif, a jpeg, an mpeg, a swif, and/or any other type of information that may be output for display.

In some implementations, the I/O module 122 may execute a zero client communication protocol with the host computer 300. The zero client communication protocol may facilitate the host computer 300 communicating to the zero client processor 103 display information based on the process executing at the host computer 300. In some implementations, only display information may be communicated between the host computer 300 and the zero client processor 103 during a zero client mode. For example, the portable computing device 100 may act as a terminal (e.g., display and input interface) for the host computer 300. During the wired zero client mode, the zero client communication protocol may operate the wired communication channel to facilitate communication between the portable computing device 100 and the host computer 300 independent of operation of the one or more local control processors 101. During the wireless zero client mode, the zero client communication protocol may operate via a wireless communication protocol facilitated by the CG module 110 that executes on the local processor 101. In this manner, the CG module 110 provides wireless communication between the portable computing device 100 and the host computer 300 during the wireless zero client mode. The zero client communication protocol operating via the wireless communication protocol may facilitate the host computer 300 communicating to the zero client processor 103 display information based on the process executing at the host computer 300.

In some implementations, the mode management module 124 may execute the zero client communication protocol with the host computer 300.

In some implementations, the portable computing device 100 may act as a terminal (e.g., display and input interface) for the host computer 300 during a zero client mode. For example, the zero client module 120 may merely communicate input information from an I/O device 105 to the host computer 300 and/or may merely communication display information from the host computer 300 to the I/O device 105.

In some implementations, the mode management module 124 may be configured to manage a plurality of modes of zero client operation of the portable computing device 100. The mode management module 124 may facilitate switching from one mode of zero client operation to another mode of zero client operation. For example, the portable computing device 100 may receive an indication to switch from one mode of operation to another mode of operation. The indication may be a same or similar indication as that received by the mode management module 114 of the CG module 110. Based on the received indication, the mode management module 124 may facilitate switching from the wired zero client mode to the wireless zero client mode, from the wireless zero client mode to the wired zero client mode, and/or between other modes of zero client operation. In some implementations, the functionality of the mode management module 124 may be implemented via the mode management module 114. In some implementations, mode management may be executed by the one or more local control processors 101, the one or more zero client processors 103, and/or other processors.

In some implementations, the network management module 126 may provide network functionality to the portable computing device 100 during the wired zero client mode. During the wired zero client mode, network management module 126 of the zero client module 120 may provide the wired network connection between the portable computing device 100 and the host computer 300. During the wireless zero client mode, the portable computing device 100 may rely on the network management module 116 of the CG module 110 to provide a wireless network connection to the host computer 300.

In some implementations of the zero client mode, the network management module 116 may provide routing capabilities for the portable computing device 100. For example, the network management module 116 may provide a virtual private network (VPN) tunnel between the portable computing device 100 and the host computer 300 during the wireless zero client mode. In these implementations, the network management module 116 may provide routing services for the portable computing device 100. The wired network connection provided by the network management module 126 may operate independently from the CG module 110. In some implementations, the network management module 116 may also be configured to provide VPN tunneling during some implementations of the wired zero client mode.

In some implementations of the wired zero client mode, the portable computing device 100 may be part of a Wide Area Network (WAN). In these implementations, the network management module 126 may use virtual machine functionality to communicate with the host computer 300. For example, the network management module 126 may use a VMware Secure Gateway to communicate with the host computer 300.

The storage module 130 may be configured to store information related to system usage. For example, the storage information may be configured to store information related to the plurality of modes and system usage related to a respective mode. For example, the storage module 130 may be configured to store an amount of time the portable computing device 100 spends in a respective mode. The storage module 130 may also be configured to store processing time and processing utilization for the one or more local control processors 101 and the one or more zero client processors 103.

In some implementations, a local control processor 101 may be configured to execute the CG module 110 and/or other functionality. In some implementations, a zero client processor 103 may be configured to execute the zero client module 120, some or all of the functionality of the CG module 110, and/or other functionality.

Figure 2:
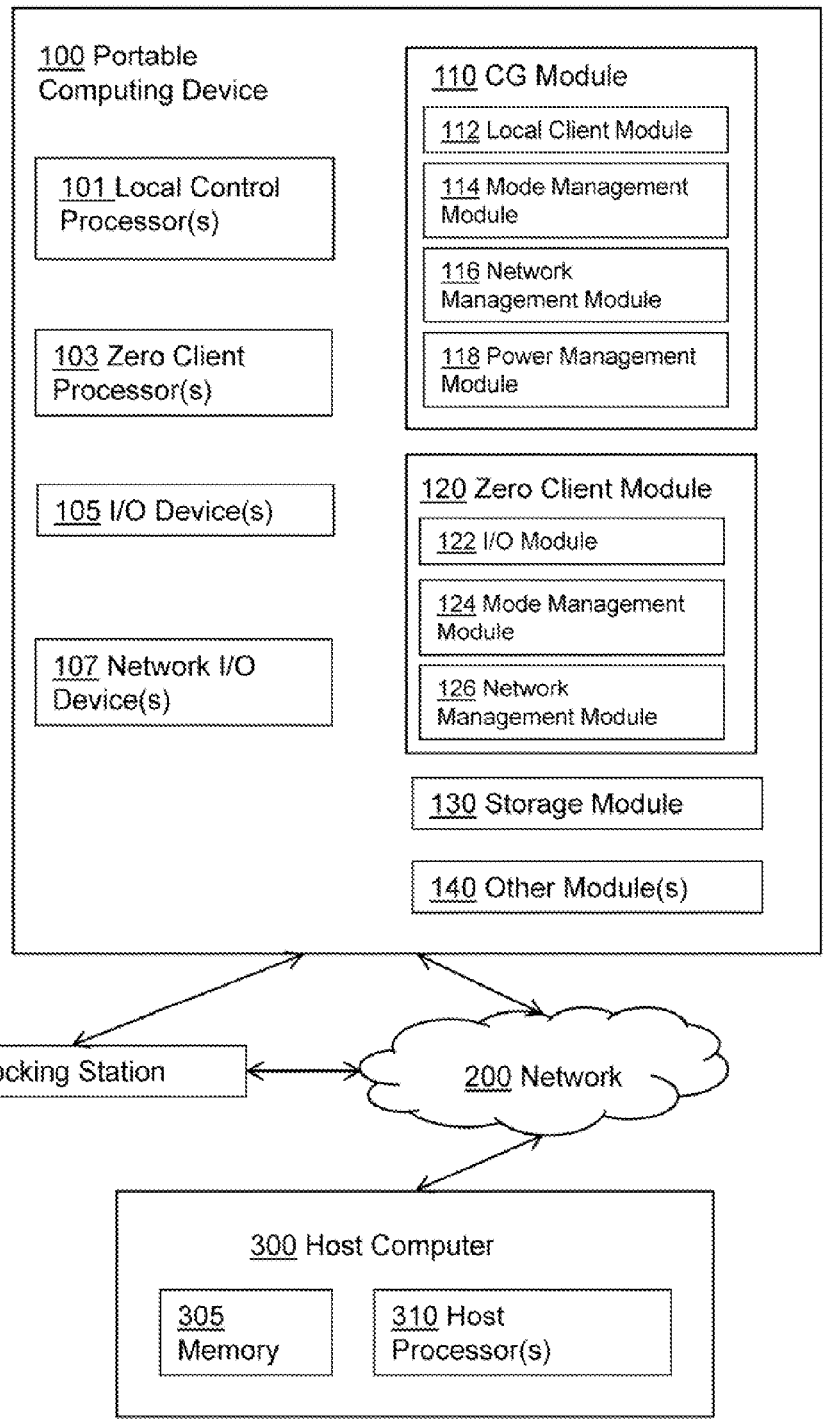
FIG. 2 illustrates a system for operating a portable computing device configured to switch between one or more zero client modes and a local mode, according to an aspect of the invention.

FIG. 2 illustrates a diagram of a system 10 for operating a portable computing device configured to switch between one or more zero client modes and a local mode. The system 10 may include a portable computing device 100 and a host computer 300 remote from the portable computing device 100. In some implementations, the system illustrated in FIG. 2 is similar to the system illustrated in FIG. 1 with at least the following differences.

In FIG. 2, system 10 further includes docking station 400. In some implementations, portable computing device 100 may be communicably operable with docking station 400. For example, portable computing device 100 may be physically connected to docking station 400. In some implementations, docking station 400 may provide a wired network communication to the host computer 300. In these implementations, docking station 400 may facilitate a wired communication channel between the portable computing device 100 and the host computer 300 during a wired zero client mode. Docking station 400 may provide AC power to portable computing device 100. Docking station 400 may also provide physical ports for one or more external I/O devices 105. In some implementations, the portable computing device 100 may communicate with one or more of the external I/O devices 105 via docking station 400. In these implementations, docking station 400 may provide, for the portable computing device 100, the replication of one or more ports for the respective one or more external I/O devices 105. In some of these implementations, the zero client processor 103 may view the one or more replicated ports as internal I/O device ports. The docking station 400 may facilitate communication between one or more of the external I/O devices 105 and the portable computing device 100. For example, the docking station 400 may facilitate communication between one or more of the external I/O devices 105 and the zero client processor 103. The external I/O devices 105 may include, for example, a printer, a mouse, biometric authenticating devices, and/or other devices external to the portable computing device 100 and communicably operable to the docking station 400. In some implementations, portable computing device 100 may also be communicably operable with docking station 400 during a wireless zero client mode, a local client mode, and/or other modes of operation for portable computing device 100. As would be appreciated, the wired zero client mode may establish a wired network connection without a docking station, such as via a wired connection to the network via an Ethernet port.

Figure 3:
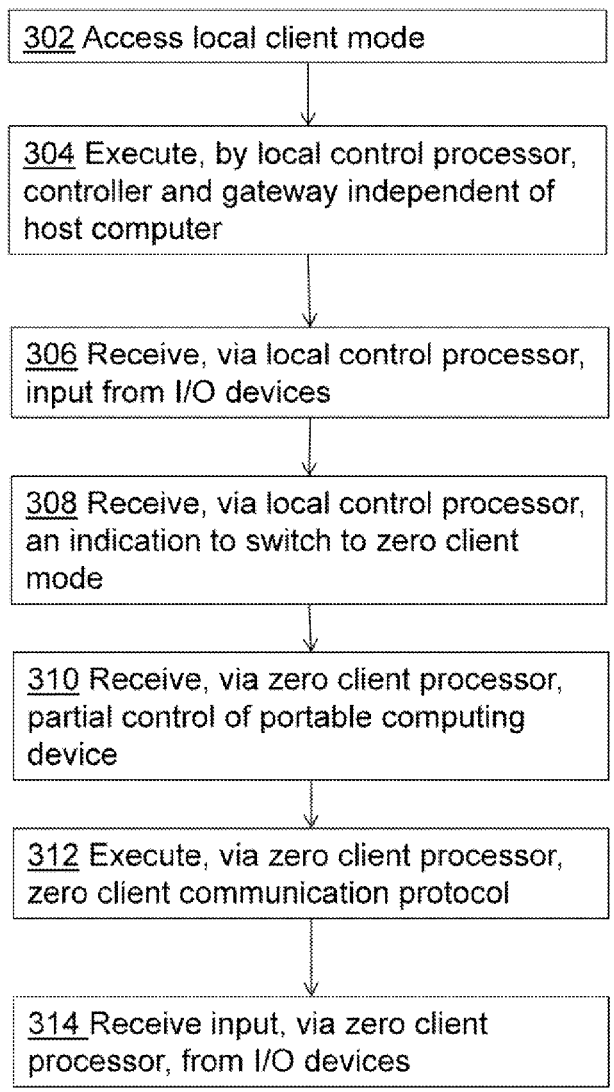
FIG. 3 illustrates a process for operating a portable computing device configured to switch between one or more zero client modes and a local mode, according to an aspect of the invention.

FIG. 3 illustrates a process for operating a portable computing device configured to switch between one or more zero client modes and a local mode, according to an aspect of the invention. The described operations of FIG. 3 and other figures may be accomplished using some or all of the system components described in detail above and, in some implementations, various operations may be performed in different sequences. In other implementations, additional operations may be performed along with some or all of the operations shown in FIG. 3 and the other figures. In yet other implementations, one or more operations may be performed simultaneously. In yet other implementations, one or more combinations of various operations may be performed. Some implementations may not perform all of the operations described with relation to FIG. 3 and other figures. Accordingly, the operations described are exemplary in nature and, as such, should not be viewed as limiting.

In an operation 302, portable computing device 100 may be accessed in a local client mode. For example, a local client mode of operation may be selected via the operation menu displayed by the mode management module 114 upon start-up of the portable computing device 100. In another example, the mode of operation of the portable computing device 100 may have previously been switched to local client mode.

In an operation 304, the local control processor 101 may cause the CG module 110 to be executed on the portable computing device 100. In some implementations, the local client module 112 of the CG module 100 may be configured to operate the portable computing device 100 in a local client mode. The local client module 112 may be configured to operate the portable computing device 100 independent of the host computer 300. For example, the local client module 112 may include or otherwise execute an operating system of the portable computing device 100. In some implementations, the local client module 112 may be configured to receive input from one or more input devices during the local client mode. The local control processor 101 may also be configured to provide display information based on one or more processes executing at the local control processor 101.

In an operation 306, the local control processor 101 may be configured to receive input from one or more I/O devices 105 during the local client mode. The local control processor 101 may also be able to process the input received from the one or more I/O devices 105 and/or data received via network 200. The local control processor 101 may also be configured to provide display information based on one or more processes executing at the local control processor 101.

In an operation 308, the local control processor may receive, via the mode management module 114, an indication to switch the operating mode of the portable computing device 100. The indication may be a similar or same type of indication described above with respect to the mode management module 114 of the CG module 110. The indication may comprise an indication to switch from the local client mode to a zero client mode. When the indication to switch to a zero client mode has been received, the local control processor 101 may discontinue the operation of the local client mode. For example, the local control processor 101 may discontinue operation of an operating system executed by the local control processor. The local control processor 101 may also discontinue the display of information via an I/O device 105 from the local control processor.

In an operation 310, the zero client processor 103 may receive at least partial control of the portable computing device 100 from the local control processor 101. The zero client processor 103 may receive the at least partial control when the local mode has been discontinued by the local control processor 101 based on the indication to switch the portable computing device 100 to the zero client mode. The portable computing device 100 may act as a terminal (e.g., display and input interface) for the host computer 300 during the zero client mode.

In an operation 312, the zero client processor 103 may execute a zero client communication protocol with the host computer 300. The zero client communication protocol may facilitate the host computer 300 communicating to the zero client processor 103 display information based on the process executing at the host computer 300. In some implementations, only display information may be communicated between the host computer 300 and the zero client processor 103 during zero client mode.

In an operation 314, the zero client processor 103 may receive input from one or more I/O devices 105. For example, the I/O module 122 of the zero client module 120 may be configured to receive input information via an I/O device 105 to be communicated to the host computer 300 using the zero client communication protocol. The input information received via the I/O device 105 may be input in relation to a process executing at the host computer 300. The I/O module 122 may also be configured to receive display information from the host computer 300 to display via the I/O device 105 using the zero client communication protocol. The display information received from the host computer 300 may be based on a process executing at the host computer 300 and may be responsive to the input information received via the I/O device 105 and communicated to the host computer 300. In some implementations, the I/O module 122 of the zero client module 120 may execute the zero client communication protocol. In some implementations, the mode management module 124 of the zero client module 120 may execute the zero client communication protocol.

Figure 4:
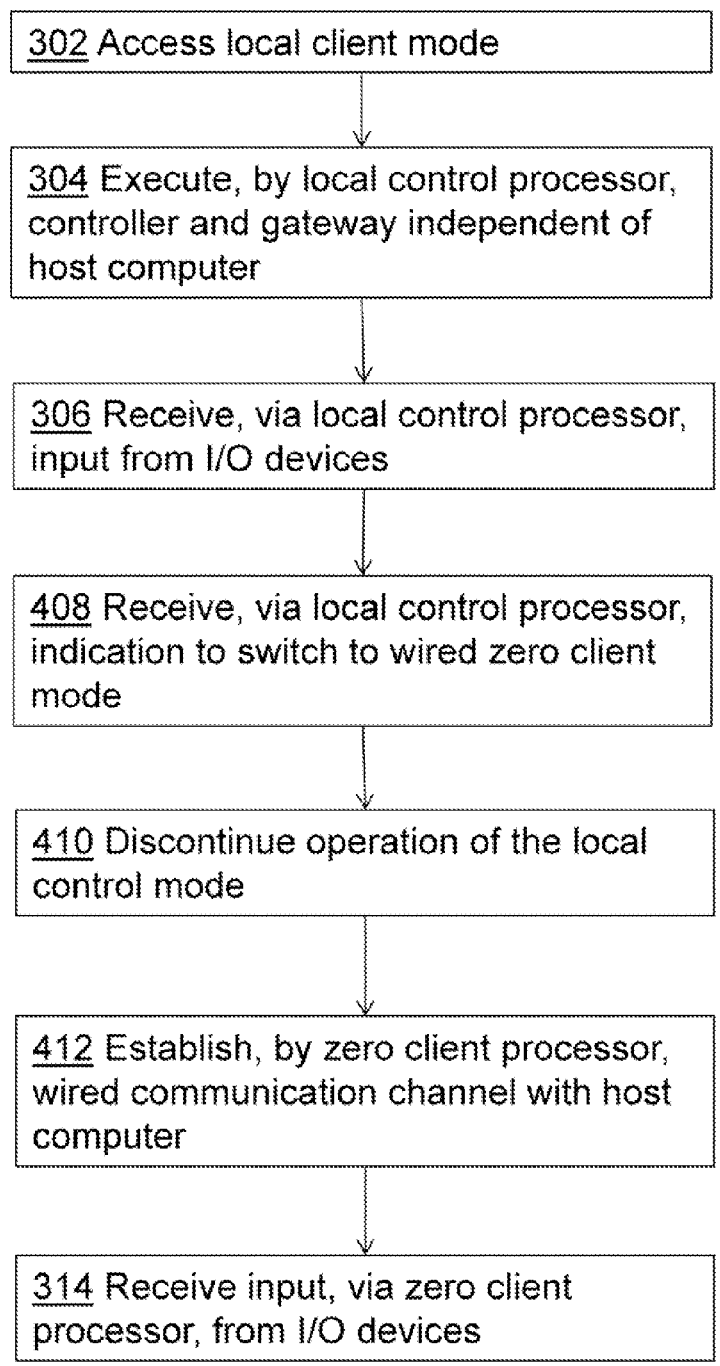
FIG. 4 illustrates a process for operating a portable computing device configured to switch between one or more zero client modes and a local, according to an aspect of the invention.

FIG. 4 illustrates a process for operating a portable computing device configured to switch between one or more zero client modes and a local mode, according to an aspect of the invention. In some implementations, the process illustrated in FIG. 4 is similar to the process illustrated in FIG. 3 with at least the following differences in operation.

In an operation 408, the local control processor may receive, via the mode management module 114, an indication to switch the operating mode of the portable computing device 100. The indication may be a similar or same type as the indication described above with respect to the mode management module 114 of the CG module 110. The indication may comprise an indication to switch from the local client mode to a wired zero client mode.

In an operation 410, the local control processor 101 may discontinue the operation of the local control mode and the CG module 110. For example, the local control processor 101 may discontinue operation of an operating system executed by the local control processor. The local control processor 101 may also discontinue the display of information via an I/O device 105 from the local control processor.

In an operation 412, the zero client processor 103 may establish a wired communication channel with the host computer 300. In some implementations, the zero client processor 103 may establish the wired communication channel with the host computer 300 independent of the local control processor 101. The wired communication channel may be established via an Ethernet connection between the portable computing device 100 and the host computer 300. In some implementations, the portable computing device 100 may be physically connected to docking station 400. In these implementations, the wired communication channel may be established via a wired network connection between the docking station 400 and the host computer 300.

In some implementations, the zero client processor 103 may execute a zero client communication protocol with the host computer 300 using the wired communication channel. The zero client communication protocol may facilitate the host computer 300 communicating to the zero client processor 103 display information based on the process executing at the host computer 300. In some implementations, only display information may be communicated from the host computer 300 to the portable computing device 100 during zero client mode. The portable computing device 100 may act as a terminal (e.g., display and input interface) for the host computer 300 during the wired zero client mode.

Figure 5:
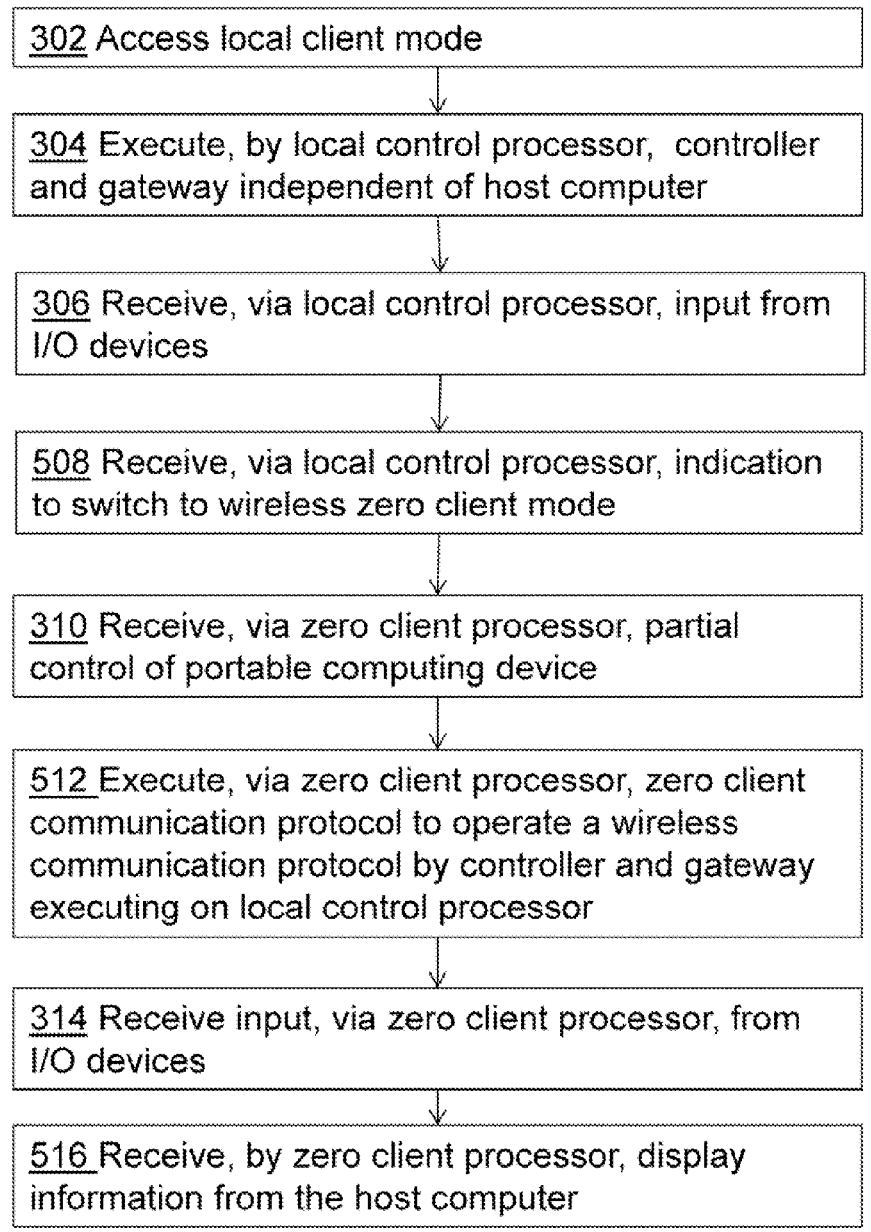
FIG. 5 illustrates a process for operating a portable computing device configured to switch between one or more zero client modes and a local mode, according to an aspect of the invention.

FIG. 5 illustrates a process for operating a portable computing device configured to switch between one or more zero client modes and a local mode, according to an aspect of the invention. In some implementations, the process illustrated in FIG. 5 is similar to the process illustrated in FIG. 3 with at least the following differences in operation.

In an operation 508, the local control processor may receive, via the mode management module 114, an indication to switch the operating mode of the portable computing device 100. The indication may be a similar or same type as the indication described above with respect to the mode management module 114 of the CG module 110. The indication may comprise an indication to switch from the local client mode to a wireless zero client mode.

In an operation 512, the zero client processor 103 may execute a zero client communication protocol with the host computer 300. For example, the I/O module 122 of the zero client module 120 may execute the zero client communication protocol. In some implementations, the zero client communication protocol may operate via a wireless communication protocol maintained by the CG module 110 that executes on the local processor 101. In some implementations, the CG module 110 provides wireless communication between the portable computing device 100 and the host computer 300 during the wireless zero client mode. The zero client communication protocol operating via the wireless communication protocol may facilitate the host computer 300 communicating to the zero client processor 103 display information based on the process executing at the host computer 300. In some implementations, only display information may be communicated from the host computer 300 to the portable computing device 100 during wireless zero client mode. The portable computing device 100 may act as a terminal (e.g., display and input interface) for the host computer 300 during the wireless zero client mode.

In an operation 516, the zero client processor 103 may receive display information from the host computer 300 to display via the I/O device 105 using the zero client communication protocol. The display information received from the host computer 300 may be based on a process executing at the host computer 300 and may be responsive to input information received via the I/O device 105 and communicated to the host computer 300.

Figure 6:
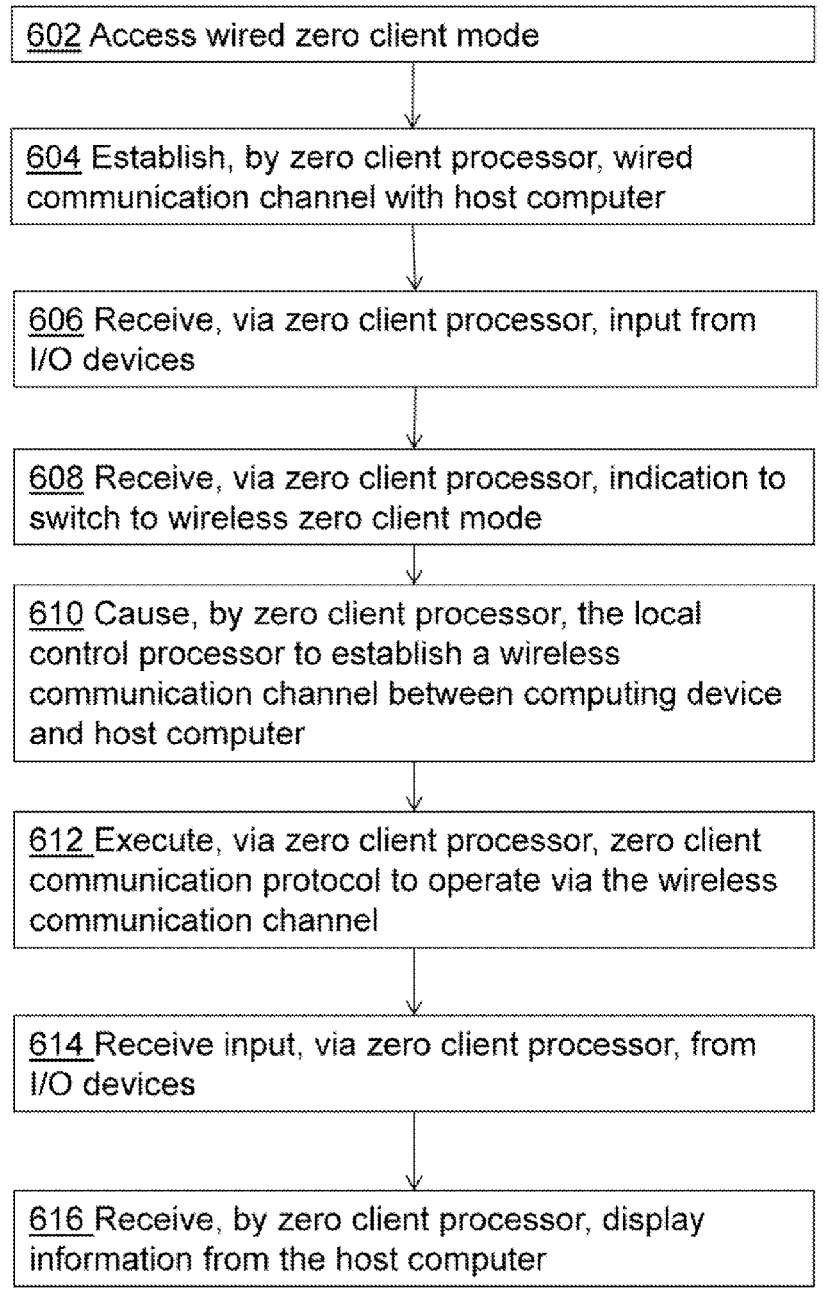
FIG. 6 illustrates a process for operating a portable computing device configured to switch between one or more zero client modes and a local mode, according to an aspect of the invention.

FIG. 6 illustrates a process for operating a portable computing device configured to switch between one or more zero client modes and a local mode, according to an aspect of the invention.

In an operation 602, portable computing device 100 may be accessed in a wired zero client mode. For example, a wired zero client mode of operation may be selected via the operation menu displayed by the mode management module 114 upon start-up of the portable computing device 100. In another example, the mode of operation of the portable computing device 100 may have previously been switched to wired zero client mode.

In an operation 604, the zero client processor 103 may establish a wired communication channel with the host computer 300. In some implementations, the zero client processor 103 may establish the wired communication channel with the host computer 300 independent of the local control processor 101. The wired communication channel may be established via an Ethernet connection between the portable computing device 100 and the host computer 300. In some implementations, the portable computing device 100 may be physically connected to docking station 400. In these implementations, the wired communication channel may be established via a wired network connection between the docking station 400 and the host computer 300.

In some implementations, the zero client processor 103 may execute a zero client communication protocol with the host computer 300 using the wired communication channel. The zero client communication protocol may facilitate the host computer 300 communicating to the zero client processor 103 display information based on a process executing at the host computer 300. In some implementations, only display information may be communicated from the host computer 300 to the portable computing device 100 during wired zero client mode. The portable computing device 100 may act as a terminal (e.g., display and input interface) for the host computer 300 during the wired zero client mode.

In an operation 606, the zero client processor 103 may receive input from one or more I/O devices 105. For example, the I/O module 122 of the zero client module 120 may be configured to receive input information via an I/O device 105 to be communicated to the host computer 300 using the zero client communication protocol. The input information received via the I/O device 105 may be input in relation to a process executing at the host computer 300. The I/O module 122 may also be configured to receive display information from the host computer 300 to display via the I/O device 105 using the zero client communication protocol. The display information received from the host computer 300 may be based on a process executing at the host computer 300 and may be responsive to the input information received via the I/O device 105 and communicated to the host computer 300. In some implementations, the I/O module 122 of the zero client module 120 may execute the zero client communication protocol using the wired communication channel. In some implementations, the mode management module 124 of the zero client module 120 may execute the zero client communication protocol using the wired communication channel.

In an operation 608, the zero client processor 103 may receive, via the mode management module 124, an indication to switch the operating mode of the portable computing device 100. The indication may be a similar or same type as the indication described above with respect to the mode management module 114 of the CG module 110. The indication may comprise an indication to switch from the wired zero client mode to a wireless zero client mode. When the indication to switch to a wireless zero client mode has been received, the zero client processor 103 may discontinue the operation of the wired zero client mode. For example, the zero client processor 103 may discontinue the wired communication channel.

In an operation 610, the zero client processor 103 may cause the local control processor 101 to establish a wireless communication channel with the host computer 300. The zero client processor 103 may cause the local control processor 101 to establish the wireless communication channel based on the indication to switch the portable computing device 100 to the wireless zero client mode.

In an operation 612, the zero client processor 103 may execute a zero client communication protocol with the host computer 300. For example, the I/O module 122 of the zero client module 120 may execute the zero client communication protocol. In some implementations, the zero client communication protocol may operate via the wireless communication channel maintained by the CG module 110 that executes on the local processor 101. The zero client communication protocol operating via the wireless communication channel may facilitate the host computer 300 communicating to the zero client processor 103 display information based on the process executing at the host computer 300. In some implementations, only display information may be communicated from the host computer 300 to the portable computing device 100 during wireless zero client mode. The portable computing device 100 may act as a terminal (e.g., display and input interface) for the computer 300 during the wireless zero client mode.

In an operation 614, the zero client processor 103 may receive input from one or more I/O devices 105. For example, the I/O module 122 of the zero client module 120 may be configured to receive input information via an I/O device 105 to be communicated to the host computer 300 using the zero client communication protocol. The input information received via the I/O device 105 may be input in relation to a process executing at the host computer 300. The I/O module 122 may also be configured to receive display information from the host computer 300 to display via the I/O device 105 using the zero client communication protocol. The display information received from the host computer 300 may be based on a process executing at the host computer 300 and may be responsive to the input information received via the I/O device 105 and communicated to the host computer 300. In some implementations, the I/O module 122 may execute the zero client communication protocol. In some implementations, the mode management module 124 of the zero client module 120 may execute the zero client communication protocol.

In an operation 616, the zero client processor 103 may receive display information from the host computer 300 to display via the I/O device 105 using the zero client communication protocol. The display information received from the host computer 300 may be based on a process executing at the host computer 300 and may be responsive to the input information received via the I/O device 105 and communicated to the host computer 300.

Figure 7:
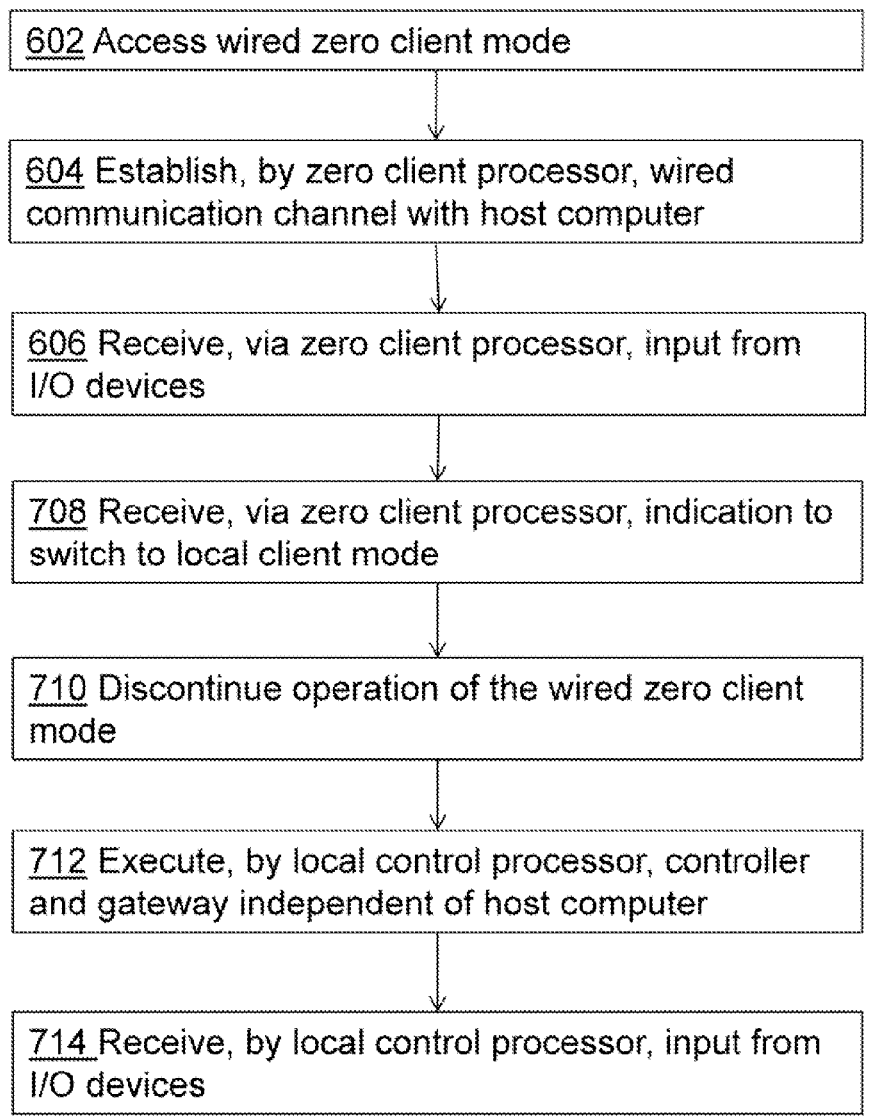
FIG. 7 illustrates a process for operating a portable computing device configured to switch between one or more zero client modes and a local mode, according to an aspect of the invention.

FIG. 7 illustrates a process for operating a portable computing device configured to switch between one or more zero client modes and a local mode, according to an aspect of the invention. In some implementations, the process illustrated in FIG. 7 is similar to the process illustrated in FIG. 6 with at least the following differences in operation.

In an operation 708, the local control processor 101 may receive, via the mode management module 114, an indication to switch the operating mode of the portable computing device 100. In some implementations, the zero client processor 103 may receive, via the mode management module 124, an indication to switch the operating mode of the portable computing device 100. The indication may be a similar or same type as the indication described above with respect to the mode management module 114 of the CG module 110. The indication may comprise an indication to switch from the wired zero client mode to the local client mode.

In an operation 710, when the indication to switch to the local client mode has been received, the zero client processor 103 may discontinue the operation of the wired zero client mode. For example, the zero client processor 103 may discontinue the wired communication channel.

In an operation 712, the local control processor 101 may cause the CG module 110 to be executed on the portable computing device 100. In some implementations, the local client module 112 of the CG module 100 may be configured to operate the portable computing device 100 in a local client mode. The local client module 112 may be configured to operate the portable computing device 100 independent of the host computer 300. For example, the local client module 112 may include or otherwise execute an operating system of the portable computing device 100.

In an operation 714, the local client module 112 may be configured to allow the local control processor 101 to receive input from one or more I/O devices 105 during the local client mode. The local control processor 101 may also be able to process the input received from the one or more I/O device 105 and/or data received via network 200. The local control processor 101 may also be configured to provide display information based on one or more processes executing at the local control processor 101.

FIG. 8 illustrates a process for operating a portable computing device configured to switch between one or more zero client modes and a local mode, according to an aspect of the invention.

In an operation 802, portable computing device 100 may be accessed in a wireless zero client mode. For example, a wireless zero client mode of operation may be selected via the operation menu displayed by the mode management module 114 upon start-up of the portable computing device 100. In another example, the mode of operation of the portable computing device 100 may have previously been switched to wireless zero client mode.

In an operation 804, the zero client processor 103 may cause the local control processor 101 to establish a wireless communication channel between the portable computing device 100 and the host computer 300. For example, the zero client processor 103 may execute a zero client communication protocol with the host computer 300. In some implementations, the I/O module 122 of the zero client module 120 may execute the zero client communication protocol. In some implementations, the zero client communication protocol may operate via a wireless communication protocol maintained by the CG module 110 that executes on the local processor 101. In some implementations, the CG module 110 may provide wireless communication between the portable computing device 100 and the host computer 300 during the wireless zero client mode. The zero client communication protocol operating via the wireless communication protocol may facilitate the host computer 300 communicating to the zero client processor 103 display information based on the process executing at the host computer 300. The portable computing device 100 may act as a terminal (e.g., display and input interface) for the host computer 300 during the wireless zero client mode.

In an operation 806, the zero client processor 103 may receive display information from the host computer 300 to display via the I/O device 105 via the zero client communication protocol. In some implementations, only display information may be communicated from the host computer 300 to the portable computing device 100 during wireless zero client mode. The display information received from the host computer 300 may be based on a process executing at the host computer 300 and may be responsive to input information received via the I/O device 105 and communicated to the host computer 300.

In an operation 808, the zero client processor 103 may receive input from one or more I/O devices 105. For example, the I/O module 122 of the zero client module 120 may be configured to receive input information via an I/O device 105 to be communicated to the host computer 300 using the zero client communication protocol. The input information received via the I/O device 105 may be input in relation to a process executing at the host computer 300.

In an operation 810, the zero client processor 103 may receive, via the mode management module 124, an indication to switch the operating mode of the portable computing device 100. The indication may be a similar or same type as the indication described above with respect to the mode management module 114 of the CG module 110. The indication may comprise an indication to switch from the wireless zero client mode to a wired zero client mode.

In an operation 812, the zero client processor 103 may discontinue the wireless communication channel. The zero client processor 103 may also discontinue execution of the zero client communication protocol using the wireless communication channel.

In an operation 814, the zero client processor 103 may discontinue the operation of the CG module 110. For example, the CG module 110 may discontinue providing wireless communication between the portable computing device 100 and the host computer 300.

In an operation 816, the zero client processor 103 may establish a wired communication channel with the host computer 300. In some implementations, the zero client processor 103 may establish the wired communication channel with the host computer 300 independent of the local control processor 101. The wired communication channel may be established via an Ethernet connection between the portable computing device 100 and the host computer 300. In some implementations, the portable computing device 100 may be physically connected to docking station 400. In these implementations, the wired communication channel may be established via a wired network connection between the docking station 400 and the host computer 300.

In an operation 818, the zero client processor 103 may receive input from one or more I/O devices 105. For example, the I/O module 122 of the zero client module 120 may be configured to receive input information via an I/O device 105 to be communicated to the host computer 300 using the zero client communication protocol. The input information received via the I/O device 105 may be input in relation to a process executing at the host computer 300. The I/O module 122 may also be configured to receive display information from the host computer 300 to display via the I/O device 105 using the zero client communication protocol. The display information received from the host computer 300 may be based on a process executing at the host computer 300 and may be responsive to the input information received via the I/O device 105 and communicated to the host computer 300. The portable computing device 100 may act as a terminal (e.g., display and input interface) for the host computer 300 during the wired zero client mode. In some implementations, the I/O module 122 of the zero client module 120 may execute the zero client communication protocol. In some implementations, the mode management module 124 of the zero client module 120 may execute the zero client communication protocol.

FIG. 9 illustrates a process for operating a portable computing device configured to switch between one or more zero client modes and a local mode, according to an aspect of the invention. In some implementations, the process illustrated in FIG. 9 is similar to the process illustrated in FIG. 8 with at least the following differences in operation.

In an operation 910, the zero client processor 103 may receive, via the mode management module 124, an indication to switch the operating mode of the portable computing device 100. In some implementations, the indication may be received via the mode management module 114 of the CG module 110 executing on the local control processor 101. The indication may be a similar or same type as the indication described above with respect to the mode management module 114 of the CG module 110. The indication may comprise an indication to switch from the wireless zero client mode to a local client mode.

In an operation 914, the local control processor 101 may cause the CG module 110 to be executed on the portable computing device 100. In some implementations, the local client module 112 of the CG module 100 may be configured to operate the portable computing device 100 in a local client mode. The local client module 112 may be configured to operate the portable computing device 100 independent of the host computer 300. For example, the local client module 112 may include or otherwise execute an operating system of the portable computing device 100.

In an operation 916, the local client module 112 may be configured to allow the local control processor 101 to receive input from one or more I/O devices 105 during the local client mode. The local control processor 101 may also be able to process the input received from the one or more I/O device 105 and/or data received via network 200. The local control processor 101 may also be configured to provide display information based on one or more processes executing at the local control processor 101.

The portable computing device 100 may include, for example, a laptop computer, a personal digital assistant, a smart phone, a tablet, and/or any other portable computing device. Other configurations and system architectures may be used. The portable computing device 100 may be capable of communicating with network 200, storage module 130 and one or more other devices, such as host computer 300.

The host computer 300 may be any computing device such as, for example, a server, a desktop computer, laptop computer, personal digital assistant, smart phone, tablet, and/or any other computing device. The host computer 300 may be capable of communicating with network 200, computing device 100, the storage module 130, and one or more other devices.

The storage module 130 may be at least one database that stores system data such as profile information for the registered users, delivery specifications associated with one or more registered users, or any other data. The storage module 130 may be associated and communicate with the computing device 100.

The one or more databases comprising the storage module 130 may be, include, or interface to, for example, an Oracle' relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access' or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some implementations, the storage module 130 may be part of or hosted by a computing device on the network 200. In some implementations, the storage module 130 may be part of or hosted by the portable computing device 100. In some implementations, the storage module 130 may be physically separate from the portable computing device 100 but may be operably communicable therewith.

In addition, implementations of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations described herein as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A portable computing device configured to switch between a plurality of modes that includes a wired zero client mode and a wireless zero client mode, the device comprising:
    memory storage configured to store machine-readable instructions;
    one or more local control processors configured, by the machine readable instruction in the memory storage, to:
        execute a controller and gateway on the portable computer device to operate the portable computer device in a local mode that operates independent of a host computer remote from the portable computer device, wherein the one or more local control processors receive input from an input device during the local mode;
        receive an indication to switch from the local mode to a zero client mode that relies upon the host computer for operation;
        discontinue the local mode based on the received indication to switch to the zero client mode; and
    one or more zero client processors configured, by the machine readable instruction in the memory storage, to:
        receive, from the one or more local control processors, at least partial control of the portable computing device when the local mode has been discontinued and based on the indication to switch to the zero client mode, wherein the one or more zero client processors receive input from the input device during the zero client mode; and
        execute a zero client communication protocol with the host computer, wherein the zero client communication protocol facilitates the host computer communicating to the one or more zero client processors only display information based on a process executing at the host computer; and, wherein
    the indication to switch from the local mode to the zero client mode comprises an indication to switch from the local mode to a wireless zero client mode;
    the one or more local control processors are further configured to:
        operate a wireless communication protocol by the controller and gateway based on the indication to switch from local mode to the wireless zero client mode, wherein the controller and gateway facilitates wireless communication between host computer and the one or more zero client processors during the wireless zero client mode; and
    the one or more zero client processors are further configured to:
        receive the display information from the host computer based on the wireless communication protocol and via the controller and gateway executed by the one or more local control processors.

2. The portable computing device of claim 1, wherein the indication to switch from the local mode to the zero client mode comprises an indication to switch from the local mode to a wired zero client mode, the one or more local control processors further configured to:
    discontinue the controller and gateway based on the indication to switch from the local mode to the wired zero client mode.

3. The portable computing device of claim 2, wherein the one or ore zero client processors are further configured to:
    establish a wired communication channel with the host computer remote from the portable computing device independent of the controller and gateway during the wired zero client mode.

4. The portable computing device of claim 1,
    wherein the indication to switch from the local mode to the zero client mode comprises an indication to switch from the local mode to a wired zero client mode,
    wherein the one or more local control processors are further configured to:
        discontinue the controller and gateway based on the indication to switch from the local mode to the wired zero client mode, and
    wherein the one or more zero client processors are further configured to:
        establish a wired communication channel with the host computer independent of the controller and gateway during the wired zero client mode,
        receive input from the input device during the wired zero client mode;
        execute a zero client communication protocol with the host computer, wherein the zero client communication protocol facilitates the host computer communicating to the one or more zero client processors only display information based on a process executing at the host computer;
        receive an indication to switch from the wired zero client mode to a wireless zero client mode;
        discontinue, based on the indication to switch to the wireless zero client mode, the wired communication channel; and
        provide, to the one or more local control processors of the portable computing device, at least partial control of the portable computing device when the wired zero client mode has been discontinued and based on the indication to switch to the wireless zero client mode, wherein the one or more local control processors are configured to:
   operate a wireless communication protocol by the controller and gateway based on the indication to switch from wired zero client mode to the wireless zero client mode; and
   facilitate, by the controller and the gateway, wireless communication between the host computer and the one or more zero client processors during the wireless zero client mode.

5. The portable computing device of claim 1,
wherein the indication to switch from the local mode to the zero client mode comprises an indication to switch from the local mode to a wireless zero client mode,
wherein the one or more local control processors are further configured to:
   discontinue the local mode;
   operate a wireless communication protocol by the controller and gateway based on the indication to switch from local mode to the wireless zero client mode, and
   facilitate, by the controller and the gateway, wireless communication between the host computer and the one or more zero client processors during the wireless zero client mode, and
wherein the one or more zero client processors are further configured to:
   receive input from the input device during the wireless zero client mode;
   execute a zero client communication protocol with the host computer, wherein the zero client communication protocol facilitates the host computer communicating to the one or more zero client processors only display information based on a process executing at the host computer;
   receive the display information from the host computer based on the wireless communication protocol and via the controller and gateway executed by the one or more local control processors;
   receive an indication to switch from the wireless zero client mode to a wired zero client mode;
   cause operation of the controller and gateway to be discontinued based on the indication to switch from the wireless zero client mode to the wired zero client mode; and
   establish a wired communication channel with the host computer independent of the controller and gateway during the wired zero client mode.

6. The portable computing device of claim 1,
wherein the indication to switch from the local mode to the zero client mode comprises an indication to switch from the local mode to a wired zero client mode,
wherein the one or more local control processors are further configured to:
   discontinue the controller and gateway based on the indication to switch from the local mode to the wired zero client mode, and
wherein the one or more zero client processors are further configured to:
   establish a wired communication channel with the host computer independent of the controller and gateway during the wired zero client mode;
   receive input from the input device during the wired zero client mode;
   execute a zero client communication protocol with the host computer, wherein the zero client communication protocol facilitates the host computer communicating to the one or more zero client processors only display information based on a process executing at the host computer;
   receive an indication to switch from the wired zero client rode to a local mode;
   discontinue, based on the indication to switch to the local mode, the wired communication channel; and
   provide, to the one or more local control processors of the portable computing device, at least partial control of the portable computing device when the wired communication channel has been discontinued and based on the indication to switch to the local mode, wherein the one or more local control processors are configured to:
      execute a controller and gateway on the portable computer device to operate the portable computer device in a local mode that operates independent of a host computer remote from the portable computer device, wherein the one or more local control processors receive input from an input device during the local mode.

7. The portable computing device of claim 1,
wherein the indication to switch from the local mode to the zero client mode comprises an indication to switch from the local mode to a wireless zero client mode,
wherein the one or more local control processors are further configured to:
   operate a wireless communication protocol by the controller and gateway based on the indication to switch from local mode to the wireless zero client mode; and
   facilitate, by the controller and the gateway, wireless communication between the host computer and the one or more zero client processors during the wireless zero client mode, and
wherein the one or more zero client processors are further configured to:
   receive input from the input device during the wireless zero client mode;
   execute a zero client communication protocol with the host computer, wherein the zero client communication protocol facilitates the host computer communicating to the one or more zero client processors only display information based on a process executing at the host computer;
   receive the display information from the host computer based on the wireless communication protocol and via the controller and gateway executed by the one or more local control processors;
   receive an indication to switch from the wireless zero client mode to a local mode; and
   provide, to the one or more local control processors of the portable computing device, at least partial control of the portable computing device based on the indication to switch to the local mode, wherein the one or more local control processors are configured to:
      execute a controller and gateway on the portable computer device to operate the portable computer device in a local mode that operates independent of a host computer remote from the portable computer device, wherein the one or more local control processors receive input from an input device during the local mode.

8. The portable computing device of claim 1, wherein the one or ore local control processors are further configured to:
   facilitate wireless communication between the host computer and the one or more zero client processors during the wireless zero client mode by establishing a virtual private network (VPN) tunnel to the host computer.

9. A method of operating a portable computing device configured to switch between a plurality of modes that includes a wired zero client mode and a wireless zero client mode, the method comprising:

executing, by one or more local control processors, a controller and gateway on the portable computer device to operate the portable computer device in a local mode that operates independent of a host computer remote from the portable computer device, wherein the one or more local control processors receive input from an input device during the local mode;

receiving, by the one or more local control processors, an indication to switch from the local mode to a zero client mode that relies upon the host computer for operation;

discontinuing, by the one or more local control processors, the local mode based on the received indication to switch to the zero client mode; and receiving, by one or more zero client processors and from the one or more local control processors, at least partial control of the portable computing device when the local mode has been discontinued and based on the indication to switch to the zero client mode, wherein the one or more zero client processors receive input from the input device during the zero client mode; and executing, by the one or more zero client processors, a zero client communication protocol with the host computer, wherein the zero client communication protocol facilitates the host computer communicating to the one or more zero client processors only display information based on a process executing at the host computer; and wherein, the indication to switch from the local mode to the zero client mode comprises an indication to switch from the local mode to a wireless zero client mode, and the method further comprising:

operating, by the one or more local control processors, a wireless communication protocol by the controller and gateway based on the indication to switch from local mode to the wireless zero client mode, wherein the controller and gateway facilitates wireless communication between host computer and the one or more zero client processors during the wireless zero client mode; and receiving, by the one or more zero client processors, the display information from the host computer based on the wireless communication protocol and via the controller and gateway executed by the one or more local control processors.

10. The method of claim 9, wherein the indication to switch from the local mode to the zero client mode comprises an indication to switch from the local mode to a wired zero client mode, the method further comprising:

discontinuing, by the one or more local control processors, the controller and gateway based on the indication to switch from the local mode to the wired zero client mode.

11. The method of claim 10, further comprising:

establishing, by the one or more zero client processors, a wired communication channel with the host computer remote from the portable computing device independent of the controller and gateway during the wired zero client mode.

12. The method of claim 9, wherein the indication to switch from the local mode to the zero client mode comprises an indication to switch from the local mode to a wired zero client mode, the method further comprising:

discontinuing, by the one or more local control processors, the controller and gateway based on the indication to switch from the local mode to the wired zero client mode, and establishing, by the one or more zero client processors, a wired communication channel with the host computer independent of the controller and gateway during the wired zero client mode, receiving, by the one or more zero client processors, input from the input device during the wired zero client mode;

executing, by the one or more zero client processors, a zero client communication protocol with the host computer, wherein the zero client communication protocol facilitates the host computer communicating to the one or more zero client processors only display information based on a process executing at the host computer;

receiving, by the one or more zero client processors, an indication to switch from the wired zero client mode to a wireless zero client mode;

discontinuing, by the one or more zero client processors, the wired communication channel based on the indication to switch to the wireless zero client mode; and providing, by the one or more zero client processors, to the one or more local control processors of the portable computing device, at least partial control of the portable computing device when the wired zero client mode has been discontinued and based on the indication to switch to the wireless zero client mode;

operating, by the one or more local control processors, a wireless communication protocol by the controller and gateway based on the indication to switch from wired zero client mode to the wireless zero client mode; and facilitating, by the controller and gateway executing on the one or more local control processors, wireless communication between the host computer and the one or more zero client processors during the wireless zero client mode.

13. The method of claim 9, wherein the indication to switch from the local mode to the zero client mode comprises an indication to switch from the local mode to a wireless zero client mode, the method further comprising:

discontinuing, by the one or more local control processors, the local mode;

operating, by the one or more local control processors, a wireless communication protocol by the controller and gateway based on the indication to switch from local mode to the wireless zero client mode, and facilitating, by the controller and the gateway executing on the one or more local control processors, wireless communication between the host computer and the one or more zero client processors during the wireless zero client mode, and receiving, by the one or more zero client processors, input from the input device during the wireless zero client mode;

executing, by the one or more zero client processors, a zero client communication protocol with the host computer, wherein the zero client communication protocol facilitates the host computer communicating to the one or more zero client processors only display information based on a process executing at the host computer;

receiving, by the one or more zero client processors, the display information from the host computer based on the wireless communication protocol and via the controller and gateway executed by the one or more local control processors;

receiving, by the one or more zero client processors, an indication to switch from the wireless zero client mode to a wired zero client mode;

causing, by the one or more zero client processors, operation of the controller and gateway to be discontinued based on the indication to switch from the wireless zero client mode to the wired zero client mode; and establishing, by the one or more zero client processors, a wired communication channel with the host computer independent of the controller and gateway during the wired zero client mode.

14. The method of claim 9, wherein the indication to switch from the local mode to the zero client mode comprises an indication to switch from the local mode to a wired zero client mode, the method further comprising:

discontinuing, by the one or more local control processors, the controller and gateway based on the indication to switch from the local mode to the wired zero client mode;

establishing, by the one or more local control processors, a wired communication channel with the host computer independent of the controller and gateway during the wired zero client mode;

receiving, by the one or more zero client processors, input from the input device during the wired zero client mode;

executing, by the one or more zero client processors, a zero client communication protocol with the host computer, wherein the zero client communication protocol facilitates the host computer communicating to the one or more zero client processors only display information based on a process executing at the host computer;

receiving, by the one or more zero client processors, an indication to switch from the wired zero client mode to a local mode;

discontinuing, by the one or more zero client processors, the wired communication channel based on the indication to switch to the local mode; and providing, by the one or more zero client processors and to the one or more local control processors of the portable computing device, at least partial control of the portable computing device when the wired communication channel has been discontinued and based on the indication to switch to the local mode;

executing, by the controller and gateway executing on the one or more local control processors, to operate the portable computer device in a local mode that operates independent of a host computer remote from the portable computer device, wherein the one or more local control processors receive input from an input device during the local mode.

15. The method of claim 9, wherein the indication to switch from the local mode to the zero client mode comprises an indication to switch from the local mode to a wireless zero client mode, the method further comprising:

operating, by the one or more local control processors, a wireless communication protocol by the controller and gateway based on the indication to switch from local mode to the wireless zero client mode; and facilitating, by the controller and the gateway executing on the one or more local control processors, wireless communication between the host computer and the one or more zero client processors during the wireless zero client mode, and receiving, by the one or more zero client processors, input from the input device during the wireless zero client mode;

executing, by the one or more zero client processors, a zero client communication protocol with the host computer, wherein the zero client communication protocol facilitates the host computer communicating to the one or more zero client processors only display information based on a process executing at the host computer;

receiving, by the one or more zero client processors, the display information from the host computer based on the wireless communication protocol and via the controller and gateway executed by the one or more local control processors;

receiving, by the one or more zero client processors, an indication to switch from the wireless zero client mode to a local mode;

providing, by the one or more zero client processors and to the one or more local control processors of the portable computing device, at least partial control of the portable computing device based on the indication to switch to the local mode;

execute, by the controller and gateway executing on the one or more local control processors, the portable computer device in a local mode that operates independent of a host computer remote from the portable computer device, wherein the one or more local control processors receive input from an input device during the local mode.

16. The method of claim 9, further comprising:

facilitating, by the one or more local control processors, wireless communication between the host computer and the one or more zero client processors during the wireless zero client mode by establishing a virtual private network (VPN) tunnel to the host computer.

17. A portable computing device configured to switch between a plurality of modes that includes a wired zero client mode and a wireless zero client mode, the device comprising:

memory storage configured to store machine-readable instructions;

one or more local control processors configured by the machine-readable instructions stored in the memory storage to:

execute a controller and gateway on the portable computer device to operate the portable computer device in a local mode that operates independent of a host computer remote from the portable computer device, wherein the one or more local control processors receive input from an input device during the local mode; and one or more zero client processors configured, by the machine-readable instructions stored in the memory storage, to:

establish a wired communication channel with a host computer remote from the portable computing device during a wired zero client mode, wherein the portable computing device relies on the host computer for operation during the wired zero client mode;

execute, independent of the one or more local control processors, a wired zero client communication protocol with the host computer, wherein the wired zero client communication protocol facilitates the host computer communicating to the one or more zero client processors only display information based on a process executing at the host computer, wherein the one or more zero client processors receive input from one or more input devices during the wired zero client mode;

receive an indication to switch from the wired zero client mode to a wireless zero client mode, wherein the portable computing device continues to rely on the host computer for operation during the wireless zero client mode;

discontinue the wired communication channel with the host computer based on the received indication to switch to the wireless zero client mode; and cause the one or more local control processors of the portable computing device to establish a wireless communication channel between the one or more zero client processors and the host computer based on the indication to switch from the wired zero client mode to the wireless zero client mode, wherein the one or more zero client processors receives only display information from the host computer based on a process executing at the host computer via the wireless communication channel established by the one or more local control processors during the wireless zero client mode.

18. The portable computing device of claim 17, wherein the one or more zero client processors are further configured to:

receive the display information from the host computer via the wireless communication channel established by the one or more local control processors during the wireless zero client mode.

19. The portable computing device of claim 17, wherein the indication to switch from the wired zero client mode to the wireless zero client mode comprises an indication to switch from the wired zero client mode to a local mode, wherein the one or more zero client processors are further configured to:

discontinue, based on the indication to switch to the local mode, the wireless communication channel; and provide, to the one or more local control processors of the portable computing device, at least partial control of the portable computing device when the wireless communication channel has been discontinued and based on the indication to switch to the local mode, wherein the one or more local control processors are configured to:

receive an indication to switch from the local mode to a zero client mode that relies upon the host computer for operation; and discontinue the local mode based on the received indication to switch to the zero client mode;

wherein, based on the indication to switch from the local mode to a zero client mode, the one or more zero client processors configured to:

receive, from the one or more local control processors, at least partial control of the portable computing device when the local mode has been discontinued and based on the indication to switch to the zero client mode, wherein the one or more zero client processors receive input from the input device during the zero client mode; and execute a zero client communication protocol with the host computer, wherein the zero client communication protocol facilitates the host computer communicating to the one or more zero client processors only display information based on a process executing at the host computer.

20. The portable computing device of claim 19, wherein the indication to switch from the local mode to the zero client mode comprises an indication to switch from the local mode to a wired zero client mode, the one or more local control processors further configured to:

discontinue the controller and gateway based on the indication to switch from the local mode to the wired zero client mode.

21. The portable computing device of claim 20, wherein the one or more zero client processors are further configured to:

establish a wired communication channel with the host computer remote from the portable computing device independent of the controller and gateway during the wired zero client mode.

22. The portable computing device of claim 19, wherein the indication to switch from the local mode to the zero client mode comprises an indication to switch from the local mode to a wireless zero client mode, wherein the one or more zero client processors are further configured to:

cause the one or more local control processors of the portable computing device to establish a wireless communication channel between the one or more zero client processors and the host computer based on the indication to switch from the wired zero client mode to the wireless zero client mode, wherein the one or more zero client processors receives only display information from the host computer based on a process executing at the host computer via the wireless communication channel established by the one or more local control processors during the wireless zero client mode.

23. The portable computing device of claim 22, wherein the one or more zero client processors are further configured to:

receive the display information from the host computer via the wireless communication channel established by the one or more local control processors during the wireless zero client mode.

24. The portable computing device of claim 17, wherein the one or more local control processors are further configured to:

facilitate wireless communication between the host computer and the one or more zero client processors during the wireless zero client mode by establishing a virtual private network (VPN) tunnel to the host computer.

* * * * *